Dec. 20, 1949     A. G. BUTLER     2,491,890
CONCRETE PIPE LINING MECHANISM

Filed May 24, 1947     2 Sheets—Sheet 1

INVENTOR.
ADOLF G. BUTLER
BY Mason & Graham
ATTORNEYS

Dec. 20, 1949     A. G. BUTLER     2,491,890

CONCRETE PIPE LINING MECHANISM

Filed May 24, 1947     2 Sheets—Sheet 2

INVENTOR.
ADOLF G. BUTLER
BY
*Mason & Graham*
ATTORNEYS

Patented Dec. 20, 1949

2,491,890

UNITED STATES PATENT OFFICE 2,491,890

CONCRETE PIPE LINING MECHANISM

Adolf G. Butler, Hawthorne, Calif., assignor to American Pipe and Construction Co., a corporation of Delaware Application May 24, 1947, Serial No. 750,216

7 Claims. (Cl. 25—38)

1

The present invention relates to a centrifugal casting mechanism, and more particularly to a mechanism for centrifugally casting concrete linings in large and heavy steel pipes.

It has been common practice for several years to cast a lining of concrete in a metal pipe by introducing concrete into the pipe while the pipe is being rotated rapidly so that centrifugal force, aided in some cases by either vibrating action or troweling, causes the concrete to spread in the form of a lining of substantially uniform thickness and density over the inner wall area of the pipe. It is usual in casting such linings, to support the pipes in the slack upper runs of belts which are passed around pairs of pulleys spaced apart horizontally from each other. The upper runs of the belts sag under the weight of a pipe supported thereon, and the driving of these belts and their associated pulleys, causes a pipe supported thereon to be rotated proportionately to the speed of the belts.

While theoretically there is no limitation to the size of the pipe which can be thus lined, it has been found, when attempts were made to build large machines to handle large sizes of pipes, that many difficulties were encountered. One reason was that the larger pipes were subjected to stresses which resulted in deforming strains on the pipe. These strains tended to weaken and disrupt the concrete lining after its initial set. Extreme difficulties also were presented by problems encountered in equalization adjustment and operation of the pipe supporting belts themselves, which were not capable of satisfactory solution.

An object of the present invention is to make an improved and simplified pipe rotating mechanism for use in the centrifugal casting of linings for pipes.

Another object is to make a centrifugal mold rotating mechanism for use in centrifugal casting operations.

Another object is to make an improved stranded cradle for rotating a large and heavy centrifugal molding device.

Another object is to make a fully adjustable cable belt support for rotating centrifugal molding equipment.

Another object is to make a continuous cable strand support for rotating a pipe while applying a lining of plastic material thereto.

Other objects and advantages of the invention will be brought out in the following description and the accompanying drawings, comprising two sheets. In the drawings:

Fig. 1 is a plan view of the mechanism embody-

2 ing the present invention, the position of a pipe supported thereon being indicated by dot-dash lines;

Figure 1:
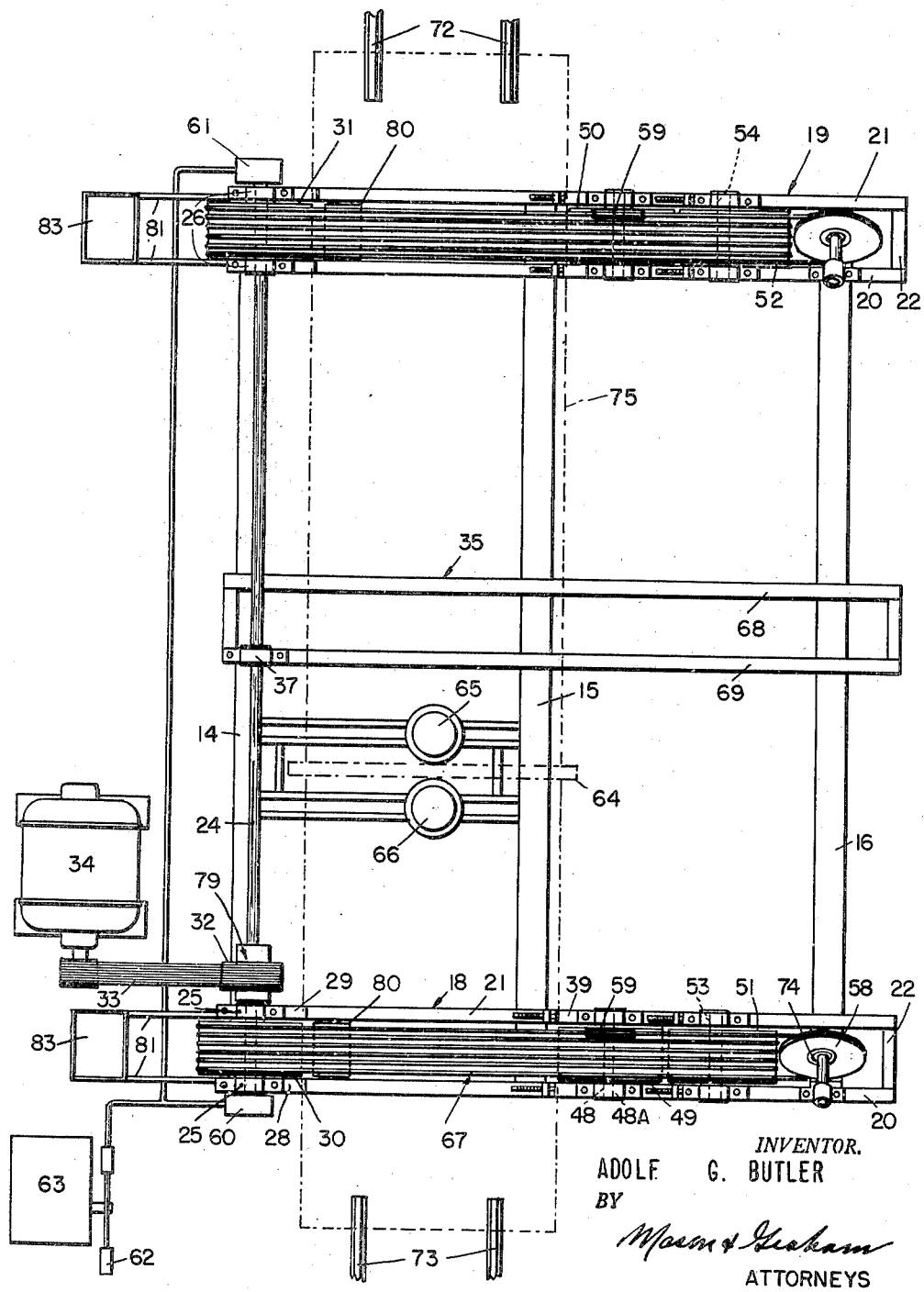

The mechanism of the present invention finds its principal field of usefulness in the centrifugal casting of linings in large pipes running generally from 3 feet to 6 feet in diameter. The lining to be applied to these pipes usually is approximately one-half inch thick. These large pipes when so lined are quite heavy. A 68-inch pipe, for example, when lined, usually weighs approximately ten tons.

Since the mechanism also is of considerable weight, it will be apparent that it must be well supported on solid footing and for that reason I prefer to employ a poured concrete base 10 (see Fig. 2) with especially heavy footings such as at 11, 12 and 13 beneath each of three fairly large I or H beams 14, 15 and 16. A pair of box girders 18 and 19 are constructed with channel side members 20 and 21, and channel end portions 22 and 23. The box girders may be of welded construction to form a substantially integral unit, and preferably are bolted or otherwise firmly secured to the supporting beams 14, 15 and 16.

Figure 2:
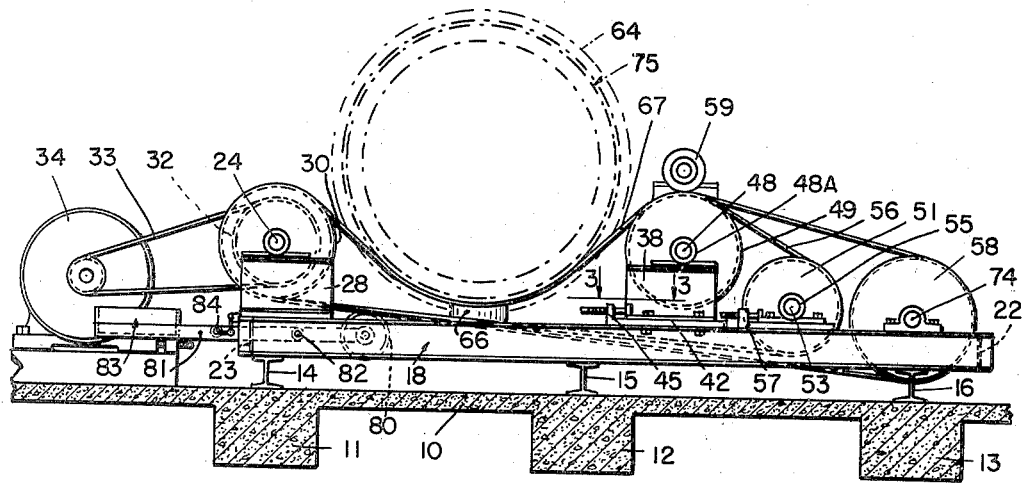
Fig. 2 is an end view of the device illustrated in Fig. 1, a mounting base therefor being illustrated sectionally.

A front drive shaft 24 is mounted in two pairs of bearings 25 and 26. The front shaft bearings are mounted on I beam bases 28 and 29 (see Fig. 2) of suitable height and strength, bolted to the box girders 18 and 19 as shown in Figs. 1 and 2. A pair of multi-grooved front pulleys 30 and 31 are mounted on the drive shaft 24, one of these pulleys being located between each pair of shaft bearings.

The drive shaft 24 is provided with a third, and smaller, multi-grooved drive pulley 32 which has driven connection, as by multiple V-belts 33, with an electric drive motor 34. A differential 79 preferably is provided in the hub of the pulley to equalize the torque on the two parts of the shaft 24 on opposite sides thereof. This is an important factor in spinning large pipes in case a pipe, during spinning, should get out of alignment across the machine.

A third box girder frame 35 preferably is provided centrally of the base 10, for the purpose of stiffening and strengthening the entire frame construction, and it is preferable to provide one additional front shaft bearing 37 on this central girder to prevent whipping of the front pulley drive shaft 24.

A pair of rear pulley bearing supports 38 and 39 are adjustably mounted on each of the end girders 18 and 19. Each of these bearing supports has slotted openings 40 and 41 therein and are mounted for adjustment longitudinally of their supporting girders. Each rear shaft bearing support is mounted on an adjustable base plate 42 (see Fig. 3). Bolts 43 and 44 are mounted through holes in the upper flange of each of the channel side members 20 and 21 of the box girders 18 and 19. These bolts also pass through the slotted openings 40 and 41 to secure the bearing supports in adjusted position. Each base plate 42 has an upwardly offset end flange 45 in which an adjusting screw 47 is threaded so that the bearing support member may be moved relatively to the base plate for adjustment. In this manner the center-to-center distance may be varied between the front pulley drive shaft 24 and a short pulley shaft 48, mounted in bearings 48A on the bearing supports 38 and 39. Grooved rear pulleys 49 and 50 are mounted on the short shafts 48, in longitudinal alignment with the front multi-grooved pulleys 30 and 31, respectively. These rear pulleys 49 and 50 are grooved similarly to the front pulleys 30 and 31.

Slack adjusting pulleys 51 and 52 are mounted one beyond each of the adjustably supported second set of pulleys 49 and 50. These slack take-up pulleys are provided with grooves similar to those of the front and rear pulleys 30, 31, 49 and 50, but are of smaller diameter than these pulleys. The slack adjusting pulleys 51 and 52 are mounted on short shafts 53 and 54 supported in bearings 55 which are adjustably mounted on the upper flanges of the side members 20 and 21 of the box girders 18 and 19. These bearings 55 are mounted on base plate 57 which are similar in structure and operation to the adjustable base plates 42.

A cable cross-over sheave 58 is mounted on the shaft 74 set at an acute angle with respect to, and rearwardly of, each of the shafts of the rear pulleys 49 and 50. These cross-over sheaves serve to transfer the cable from one side of the pulleys to the other.

Figures 3, 4:
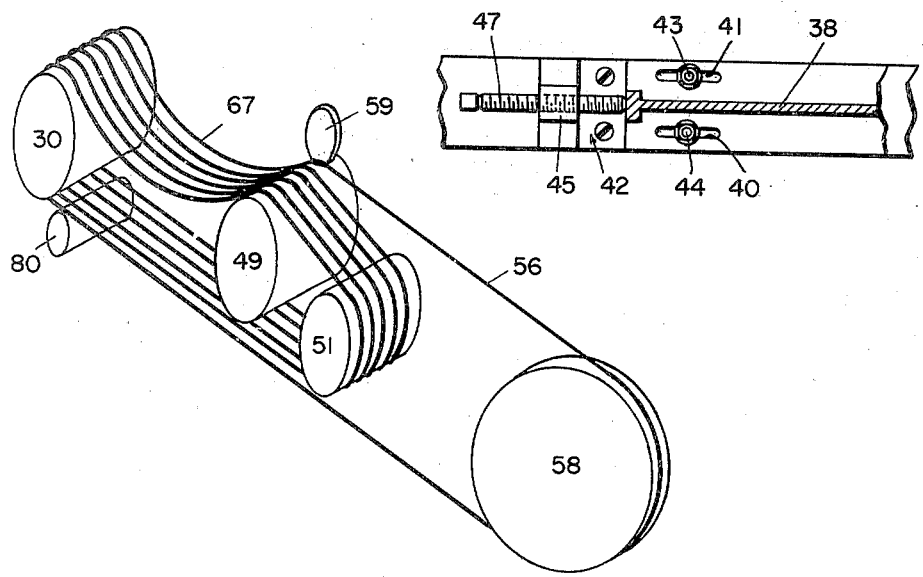
Fig. 3 is a fragmentary sectional view of a roller support taken on the line 3—3 of Fig. 2.
Fig. 4 is a somewhat diagrammatic view in perspective of the roller and sheave arrangement for the cable which comprises the rotative supporting means for the pipe.

The bottom of each cross-over sheave 58 is below the plan of the bottom of the pulleys forwardly thereof, while the top of the cross-over sheave is at a height so that a cross-over run 56 of a cable 67 will clear the top of the slack take-up pulley 51, as best shown in Fig. 4. A tension equalizing and cable anti-whip roller 80 is mounted below and rearwardly of each of the front cable support pulleys 30 and 31. These anti-whip rollers may either be of smooth cylindrical form or grooved similarly to the front cable support pulleys as desired. Each of the anti-whip rollers is shown as journalled in a lever frame 81, which is pivotally supported as at 82 on each of the box girders 18 and 19. A source of flexible mechanical pressure such as a counterweight 83 is mounted on the forward end of each of the levers 81. A shock absorber 84, which may be of a type commonly employed in automobile wheel suspensions, is mounted between the levers 81 and each of the box girders 18 and 19. For a large spinning machine capable of handling pipes of six-foot diameter I employ a force of approximately 900 pounds on a lever arm having a mechanical advantage of approximately two. The roller pressure may be adjusted as required for other sizes and weights of pipe.

The provision of the anti-whip rollers 80 eliminates a tendency for the lower runs of the cables to vibrate and whip up and down while the machine is being brought up to spinning speed. This whipping tends to occur at a critical speed usually well below a proper spinning speed, so that it is necessary to pass through this critical speed range on each pipe spinning operation. Prior to the development of the anti-whip rollers the whipping action created each time the machine was run through this critical range was such as to create a real danger of throwing a cable from its supporting pulleys. With the anti-whip rollers installed this dangerous whipping tendency is eliminated.

A cable guide idler pulley 59 is mounted over the point where the cable strand enters the initial or right-hand groove of each of the rear pulleys 49 and 50, so as to insure proper seating of the cable strand in this first or entering groove of the rear pulley. Once the cable has been threaded properly on the rollers it will, barring accidents, follow and remain in these grooves thereafter during the life of the cable without further attention.

In order to provide decelerating control, hydraulic brakes 60 and 61 preferably are provided on the ends of the front pulley drive shaft 24. These brakes may be controlled in a usual manner, as by means of a suitable actuating lever 62 and a reservoir 63 of hydraulic fluid which is connected to the brakes in a usual manner.

A pipe 75 to be lined preferably is provided with a radially extending guide flange 64 which is adapted to ride between a pair of guide rollers 65 and 66, mounted on supporting beams 68 and 69. These beams in turn are mounted between transverse support beams 70 and 71. The guide rollers preferably are mounted on ball or roller bearings sealed against the entrance of grit and sand by suitable packing or sealing means, and act to prevent endwise movement of the pipe during spinning.

A pair of steel tracks 72 and 73 preferably are provided at each end of the machine and suitable rail-supported pipe-handling mechanism is mounted on these tracks to facilitate placing pipes in position on the belts, and removing the lined pipes therefrom. Since this handling mechanism constitutes no part of the present invention, it will not be illustrated or described in detail.

In using the apparatus, the positions of the rear pulleys 49 and 50 are adjusted by means of their adjutable bases and supports to provide a required distance between the front and rear cable support pulleys. The slack adjusting pulleys also are adjusted to provide a required amount of sag in the upper runs of the cable between the front and rear pulleys. This sag may be calculated, or it may be arrived at by trial and error methods. However, once a proper setting for the rear pulleys and the slack adjusting pulleys have been determined for each size of pipe to be handled, guide marks may be scribed in the bearing supports and bases, so that future settings for similar sizes of pipe may be accomplished by the use of these guide marks. It is preferred that such guide marks be provided during manufacture of the mechanism so as to facilitate adjustment.

In the centrifugal casting of concrete pipe lining by the present method, it is desirable to have as large an arc of the cable as practicable in contact with the pipe. An optimum condition is considered to exist when the cable leaves its contact with the pipe at an angle of approximately 45° on each side of the vertical.

After the cables 67 have been adjusted, and a pipe has been deposited in position with its guide flange 64 between the guide rollers 65 and 66, the motor 34 is actuated to bring the pipe up to a desired speed of rotation. The peripheral speed of the larger pipes for which the mechanism is designed must be much greater than that of smaller pipes. A safe rule to follow in this respect is that the peripheral speed must be increased with the square root of the diameter of the pipe. When the speed of rotation of the pipe is up to the calculated requirement a trough, not shown, containing a measured quantity of cement is run into the pipe, and, by suitable mechanism not illustrated, the cement is dumped into the pipe while spinning. The concrete mix is used as dry as practicable, and the spinning is continued only until the cement has become impacted and initially set to a point where the pipe can be removed without disturbing the lining.

The multiple runs of the cable of the present mechanism are self-equalizing and have been found capable of absorbing the stresses imposed by rough spots frequently encountered on the large pipes without disturbing the spinning characteristics of the pipe. Furthermore, the life of the mechanism is much longer and more trouble free than that of previous constructions. Also, the cables are capable of much closer inspection and give adequate warning before reaching a point at which failure may be expected.

While I have described and illustrated a preferred form of my invention, it will be apparent to those familiar with the art that the mechanism is capable of several modifications without departing from the spirit of the invention. It is desired, therefore, not to limit the invention except as set forth in the following claims.

I claim:

1. Apparatus for the centrifugal molding of linings in a mold of substantially circular cross section, said apparatus comprising a pair of horizontally spaced, co-axial, multiple grooved, drive pulleys, power drive means operatively connected thereto, a second pair of similarly spaced, co-axial, multiple grooved pulleys mounted for rotation about an axis parallel to and horizontally spaced from the axis of rotation of said drive pulleys with the pulleys of said pairs being opposite each other, respectively, a pair of similarly spaced, and aligned, multiple grooved, slack adjusting pulleys mounted beyond said second pulleys from said drive pulleys, means for adjusting the axes of said second pulleys and said slack adjusting pulleys toward and away from the common axis of said drive pulleys and from each other, a cable cross-over sheave mounted with its axis disposed at an acute angle beyond said slack adjusting pulleys from said drive pulleys, the lower edge of said cross-over sheave being below a plane of alignment of the lower side of said slack adjusting pulleys and said drive pulleys, the upper edge of said cross-over sheave being above a plane of alignment of the upper side of said slack adjusting pulleys and said second pulleys, and a continuous mold support cable wound loosely in a succession of turns of a helical coil around each aligned set of pulleys, one coil of each cable passing around the cable cross-over sheave, and back to an initial point on a drive pulley, the upper runs of the coils of said cables being adapted to cradle and support and rotate a mold thereon.

2. Apparatus for the centrifugal molding of linings in a mold of substantially circular cross section, said apparatus comprising a pair of horizontally spaced co-axial, multiple grooved, drive pulleys, power drive means operatively connected thereto, a second pair of similarly spaced, co-axial multiple grooved pulleys mounted for rotation about an axis parallel to and horizontally spaced from the axis of rotation of said drive pulleys with the pulleys of said pairs being opposite each other, respectively, a pair of similarly spaced, and aligned, multiple grooved, slack adjusting pulleys mounted beyond said second pulleys from said drive pulleys, means for adjusting the axes of said second pulleys and said slack adjusting pulleys toward and away from the common axis of said drive pulleys and from each other, a continuous mold support cable wound loosely in a succession of helical coils around each aligned set of pulleys, and means for returning one coil of each cable back to an initial point on a drive pulley, the upper runs of the coils of said cables being adapted to cradle and support and rotate a mold thereon.

3. Apparatus for the centrifugal molding of linings in a mold of substantially circular cross section, said apparatus comprising a pair of horizontally spaced co-axial, multiple grooved, drive pulleys, differential drive means interconnecting said drive pulleys, power drive means operatively connected thereto, a second pair of similarly spaced, co - axial, multiple grooved pulleys mounted for rotation about an axis parallel to and horizontally spaced from the axis of rotation of said drive pulleys with the pulleys of said pairs being opposite each other, respectively, a pair of similarly spaced, and aligned multiple grooved slack adjusting pulleys mounted beyond said second pulleys from said drive pulleys, means for adjusting the axes of said second pulleys and said slack adjusting pulleys toward and away from the common axis of said drive pulleys and from each other, a continuous mold support cable wound loosely in a succession of helical coils around each aligned set of pulleys, means for returning one coil of each cable back to an initial point on a drive pulley, the upper runs of the coils of said cables being adapted to cradle and support and rotate a mold thereon.

4. A machine for spinning a pipe for centrifugally molding a hardenable plastic lining therein, comprising two horizontally spaced sets of a plurality of multiple grooved cable pulleys, the pulleys of one set being longitudinally aligned and respectively co-axial with the pulleys of the other set at least one end pulley in each set being adjustable toward and away from the other pulleys in the set, power drive means operatively connected to said pulleys, a cable cross-over sheave mounted longitudinally beyond each set of pulleys, a cable loosely coiled from a starting point at one side of a set of pulleys in a continuous helix in successive grooves of said pulleys and from a final coil around the cross-over sheave and back to the starting point, two of the pulleys in each set being spaced apart a distance to cradle a pipe in the upper runs of the cable wound thereon, and a roller resiliently pressed against the lower runs of the cable to dampen vibration impulses in the lower cable runs.

5. A machine for spinning a pipe for centrifugally molding a hardenable plastic lining therein, comprising two horizontally spaced sets of a plurality of multiple grooved cable pulleys, the pulleys of one set being longitudinally aligned and respectively co-axial with the pulleys of the other set at least one pulley in each set being adjustable toward and away from the other pulleys in the set, a cable cross-over sheave mounted longitudinally beyond each set of pulleys, a cable loosely coiled in a continuous helix in successive grooves, from a starting point at one side of a set of pulleys, and from a final coil around the crossover sheave and back to the starting point, two of the pulleys in each set being spaced apart a distance to cradle a pipe in the upper runs of the cable wound thereon, power drive means, and differential drive means operably connecting said power drive means to at least one pulley in each of said sets.

6. A machine for spinning a pipe for centrifugally molding a hardenable plastic lining therein, comprising a rigid base, a plurality of horizontally spaced multiple grooved cable pulleys mounted thereon, power drive means operatively connected to said pulleys, a plurality of self-equalizing runs of cable passing around each set of pulleys, two of the pulleys in each set being spaced apart to cradle a pipe in the upper runs of the cable wound thereon, a lever supported on said base, a roller rotatably mounted on said lever and adapted to be moved into engagement with lower runs of said cables, means resiliently urging said roller into engagement with said cable runs, and a vibration dampener associated with said roller to resist rapid movements thereof.

7. A machine for spinning a pipe for centrifugally molding a hardenable plastic lining therein, comprising a rigid base, a plurality of sets of multiple grooved cable pulleys mounted thereon, power drive means operatively connected to said pulleys, a plurality of vertically disposed, self-equalizing loops of cable passing around each set of said pulleys, two of the pulleys in each set being spaced apart to cradle a pipe in the upper runs of the cable loops thereon, means resiliently engaging the lower runs of at least a portion of said cable loops between adjacent pulleys to dampen vibration impulses therein, and means engaging the upper portion of a cable loop adjacent a pulley to seat the cable loop in a groove in said pulley.

ADOLF G. BUTLER.

REFERENCES CITED

The following references are of record in the file of this patent:

UNITED STATES PATENTS

| Number | Name | Date |
| --- | --- | --- |
| 320,544 | Dodge | June 23, 1885 |
| 423,046 | Gregg | Mar. 11, 1890 |
| 444,919 | Miller | Jan. 20, 1891 |
| 1,789,742 | Halkyard | Jan. 20, 1931 |
| 1,837,324 | Hume | Dec. 22, 1931 |
| 2,073,668 | Wilson | Mar. 16, 1937 |
| 2,120,309 | Carson | June 14, 1938 |
| 2,195,125 | Smith et al. | Mar. 26, 1940 |